United States Patent
Iwasaki (10) Patent No.: US 10,264,173 B2
(45) Date of Patent: Apr. 16, 2019

(54) IMAGE CAPTURING APPARATUS AND CONTROL METHOD THEREOF, AND STORAGE MEDIUM (71) Applicant: CANON KABUSHIKI KAISHA, Tokyo (JP)

(72) Inventor: Naoki Iwasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 15/012,063

(22) Filed: Feb. 1, 2016

(65) Prior Publication Data

US 2016/0227101 A1 Aug. 4, 2016

(30) Foreign Application Priority Data

Feb. 2, 2015 (JP) .................................. 2015-018798

(51) Int. Cl.
H04N 9/04 (2006.01)
H04N 5/232 (2006.01)
H04N 5/357 (2011.01)
H04N 5/369 (2011.01)

(52) U.S. Cl.
CPC ....... *H04N 5/23212* (2013.01); *H04N 5/3575* (2013.01); *H04N 5/3696* (2013.01); *H04N 9/045* (2013.01)

(58) Field of Classification Search
None
See application file for complete search history.

(56) References Cited

U.S. PATENT DOCUMENTS 5,408,291 A * 4/1995 Ishida .................... G02B 7/285
396/130
6,332,061 B1 * 12/2001 Arita ..................... G03B 13/36
396/104
2016/0337579 A1 * 11/2016 Tanaka .................... G02B 7/34

FOREIGN PATENT DOCUMENTS

JP 07-097173 B 10/1995
JP 09-054242 A 2/1997
JP 2000-156823 A 6/2000
(Continued)

OTHER PUBLICATIONS

The above foreign patent documents were cited in the Oct. 1, 2018 Japanese Office Action, enclosed without an English Translation, that issued in Japanese Patent Application No. 2015018798.

*Primary Examiner* — Twyler L Haskins
*Assistant Examiner* — Quan Pham
(74) *Attorney, Agent, or Firm* — Cowan, Liebowitz & Latman, P.C.

(57) ABSTRACT

An image capturing apparatus, comprises an image sensor having focus detection pixels configured to detect a phase difference of the subject image, a calculation unit configured to calculate a defocus amount of the subject image based on signals of the focus detection pixels, a focus control unit configured to adjust focus of the imaging optical system based on the defocus amount that was calculated, and a determination unit configured to determine whether or not the imaging optical system is in an in-focus state by comparing the defocus amount to a predetermined threshold value, wherein the determination unit sets a larger value for the predetermined threshold value in a case where the imaging optical system focuses on a moving subject than in a case where the imaging optical system focuses on a still subject.

17 Claims, 8 Drawing Sheets (56) References Cited

FOREIGN PATENT DOCUMENTS

| JP | 2001-004914 A | 1/2001 |
|----|---------------|--------|
| JP | 2013-003501 A | 1/2003 |
| JP | 2014-215475 A | 11/2014 |
| WO | 2015/118727 A1 | 8/2015 |

* cited by examiner

FIG. 1

FIG. 2A
PIXEL CONFIGURATION FOR NON-IMAGING PLANE PHASE DIFFERENCE METHOD

| R | Gr | R | Gr | R | Gr | R | Gr | R | Gr |
|---|----|---|----|---|----|---|----|---|----|
| Gb | B | Gb | B | Gb | B | Gb | B | Gb | B |
| R | Gr | R | Gr | R | Gr | R | Gr | R | Gr |
| Gb | B | Gb | B | Gb | B | Gb | B | Gb | B |
| R | Gr | R | Gr | R | Gr | R | Gr | R | Gr |
| Gb | B | Gb | B | Gb | B | Gb | B | Gb | B |
| R | Gr | R | Gr | R | Gr | R | Gr | R | Gr |
| Gb | B | Gb | B | Gb | B | Gb | B | Gb | B |

FIG. 2B
PIXEL CONFIGURATION FOR ON-IMAGING PLANE PHASE DIFFERENCE METHOD

| R | Gr | R | Gr | R | Gr | R | Gr | R | Gr |
|---|----|---|----|---|----|---|----|---|----|
| Gb | AF A | Gb | AF A | Gb | AF A | Gb | AF A | Gb | AF A |
| R | Gr | R | Gr | R | Gr | R | Gr | R | Gr |
| Gb | B | Gb | B | Gb | B | Gb | B | Gb | B |
| R | Gr | R | Gr | R | Gr | R | Gr | R | Gr |
| Gb | AF B | Gb | AF B | Gb | AF B | Gb | AF B | Gb | AF B |
| R | Gr | R | Gr | R | Gr | R | Gr | R | Gr |
| Gb | B | Gb | B | Gb | B | Gb | B | Gb | B |

IMAGE CAPTURING APPARATUS AND CONTROL METHOD THEREOF, AND STORAGE MEDIUM

BACKGROUND OF THE INVENTION

Field of the Invention

The present invention relates to an image capturing apparatus and a method of controlling the image capturing apparatus, and more specifically relates to technology for performing focus adjustment by an on-imaging plane phase difference detection method.

Description of the Related Art

In recent years, in an image capturing apparatus of which a single-lens reflex camera is representative, increasing weight is being given to a shooting method of shooting while viewing a live view (LV) screen. Various techniques have been proposed as autofocus (AF) methods in an image capturing apparatus, and as primary techniques there are a phase difference detection method and a contrast detection method.

In the phase difference detection method, light beams from a photographic subject that have passed through mutually differing exit pupil regions in an imaging optical system form an image on a pair of line sensors, and a defocus amount of the imaging optical system is calculated from a phase difference of a pair of image signals obtained from that pair of line sensors. Then, an in-focus state is obtained by moving a focusing lens by a movement amount that corresponds to the defocus amount that was calculated (see Japanese Patent Laid-Open No. 9-054242). However, with the above phase difference detection method, a light path to the image sensor is blocked, so shooting while viewing a LV screen is basically not possible.

In the contrast detection method, an in-focus state is obtained by searching for a focusing lens position where a contrast evaluation value generated from the image signal obtained using the image sensor becomes largest while moving the focusing lens (see Japanese Patent Laid-Open No. 2001-004914). The contrast detection method performs focusing based on the image signal, and therefore is appropriate for AF when performing LV shooting, and in recent years this method has become a mainstream AF method used when performing LV shooting. However, with the above contrast detection method it is not possible to easily determine the position and direction to move the focusing lens in order to focus on the subject. Therefore, with the contrast detection method, in some cases it takes time to perform focusing due to a mistake in the direction in which focusing should be performed or passing by the focus position.

Shooting while viewing an LV screen, for which there is increasing demand in recent years, is used not only for shooting still images but also for shooting moving images, so in the AF control, in addition to responsiveness for performing focus, quality of the focusing operation has been sought. Recently, AF methods have been proposed that are capable of focusing with high speed and high quality even when performing LV shooting. One example of those methods is an on-imaging plane phase difference detection method, in which the above phase difference detection method is performed on the plane of the image sensor.

As one type of on-imaging plane phase difference detection method, a technique has been proposed in which image forming pixels and focus detection pixels provided in some lines are arranged in an image sensor, and while performing image capturing with the image forming pixels, on-imaging plane phase difference detection is performed by comparing output signals of the focus detection pixels (see Japanese Patent Laid-Open No. 2000-156823). By using the on-imaging plane phase difference detection method, it is possible to perform autofocusing with a phase difference detection method even in LV shooting, so focusing can be performed with high speed and high quality.

Also, in recent years there is a shooting method in which in LV shooting, a subject such as a face is detected, and AF is performed on the detected face. In Japanese Patent Laid-Open No. 2013-003501, a technique is proposed in which two AF methods, both an on-imaging plane phase difference detection method and a contrast detection method, are provided, and which of the two AF methods to use is predicted and switched according to an arrangement relationship between the position of a detected subject and focus detection pixels of the on-imaging plane phase difference detection method.

However, when executing AF with the above on-imaging plane phase difference detection method, there are cases where although expected that focus point following could be quickly performed, due to movement of the subject the focus point could not be followed, so it takes some time until AF completes and as a result a photo opportunity is lost.

SUMMARY OF THE INVENTION

The present invention was made in consideration of the above-stated problems, and provides an image capturing apparatus capable of performing accurate AF without impairing the appearance of focus both in a case where the subject is still and in a case where the subject is moving.

According to a first aspect of the present invention, there is provided an image capturing apparatus, comprising: an image sensor having focus detection pixels configured to detect a phase difference of the subject image; a calculation unit configured to calculate a defocus amount of the subject image based on signals of the focus detection pixels; a focus control unit configured to adjust focus of the imaging optical system based on the defocus amount that was calculated; and a determination unit configured to determine whether or not the imaging optical system is in an in-focus state by comparing the defocus amount to a predetermined threshold value, wherein the determination unit sets a larger value for the predetermined threshold value in a case where the imaging optical system focuses on a moving subject than in a case where the imaging optical system focuses on a still subject.

According to a second aspect of the present invention, there is provided an image capturing apparatus, comprising: an image sensor having focus detection pixels configured to detect a phase difference of the subject image; a calculation unit configured to calculate a defocus amount of the subject image based on signals of the focus detection pixels; a focus control unit configured to adjust focus of the imaging optical system based on the defocus amount that was calculated; a first determination unit configured to determine whether or not the imaging optical system is in an in-focus state by comparing the defocus amount to a first threshold value; and a second determination unit configured to, after the imaging optical system was determined to be in the in-focus state by the first determination unit, determine whether or not to cause the focus control unit to operate again by comparing the defocus amount to a second threshold value, wherein the second determination unit sets a larger value for the second threshold value in a case where the imaging optical system focuses on a moving subject than in a case where the imaging optical system focuses on a still subject.

According to a third aspect of the present invention, there is provided a method of controlling an image capturing apparatus comprising an image sensor having focus detection pixels configured to detect a phase difference of the subject image, the method comprising: calculating a defocus amount of the subject image based on signals of the focus detection pixels; adjusting focus of the imaging optical system based on the defocus amount that was calculated; and determining whether or not the imaging optical system is in an in-focus state by comparing the defocus amount to a predetermined threshold value, wherein in the determining, a larger value is set for the predetermined threshold value in a case where the imaging optical system focuses on a moving subject than in a case where the imaging optical system focuses on a still subject.

According to a fourth aspect of the present invention, there is provided a method of controlling an image capturing apparatus comprising an image sensor having focus detection pixels configured to detect a phase difference of the subject image, the method comprising: calculating a defocus amount of the subject image based on signals of the focus detection pixels; adjusting focus of the imaging optical system based on the defocus amount that was calculated; performing a first determining to determine whether or not the imaging optical system is in an in-focus state by comparing the defocus amount to a first threshold value; and performing a second determining to, after the imaging optical system was determined to be in the in-focus state in the first determining, determine whether or not to cause the focus adjustment to operate again by comparing the defocus amount to a second threshold value, wherein in the second determining, a larger value is set for the second threshold value in a case where the imaging optical system focuses on a moving subject than in a case where the imaging optical system focuses on a still subject.

According to a fifth aspect of the present invention, there is provided a computer-readable storage medium storing a program for causing a computer to execute a method of controlling an image capturing apparatus comprising an image sensor having focus detection pixels configured to detect a phase difference of the subject image, the control method comprising: calculating a defocus amount of the subject image based on signals of the focus detection pixels; adjusting focus of the imaging optical system based on the defocus amount that was calculated; and determining whether or not the imaging optical system is in an in-focus state by comparing the defocus amount to a predetermined threshold value, wherein in the determining, a larger value is set for the predetermined threshold value in a case where the imaging optical system focuses on a moving subject than in a case where the imaging optical system focuses on a still subject.

According to a sixth aspect of the present invention, there is provided a computer-readable storage medium storing a program for causing a computer to execute a method of controlling an image capturing apparatus comprising an image sensor having focus detection pixels configured to detect a phase difference of the subject image, the control method comprising: calculating a defocus amount of the subject image based on signals of the focus detection pixels; adjusting focus of the imaging optical system based on the defocus amount that was calculated; performing a first determining to determine whether or not the imaging optical system is in an in-focus state by comparing the defocus amount to a first threshold value; and performing a second determining to, after the imaging optical system was determined to be in the in-focus state in the first determining, determine whether or not to cause the focus adjustment to operate again by comparing the defocus amount to a second threshold value, wherein in the second determining, a larger value is set for the second threshold value in a case where the imaging optical system focuses on a moving subject than in a case where the imaging optical system focuses on a still subject.

Further features of the present invention will become apparent from the following description of exemplary embodiments with reference to the attached drawings.

DESCRIPTION OF THE EMBODIMENTS

Below, an embodiment of the present invention will be described in detail with reference to the attached drawings. Note that the embodiment described below is merely an example, and the present invention is not limited by the configuration described in the below embodiment.

Figure 1:
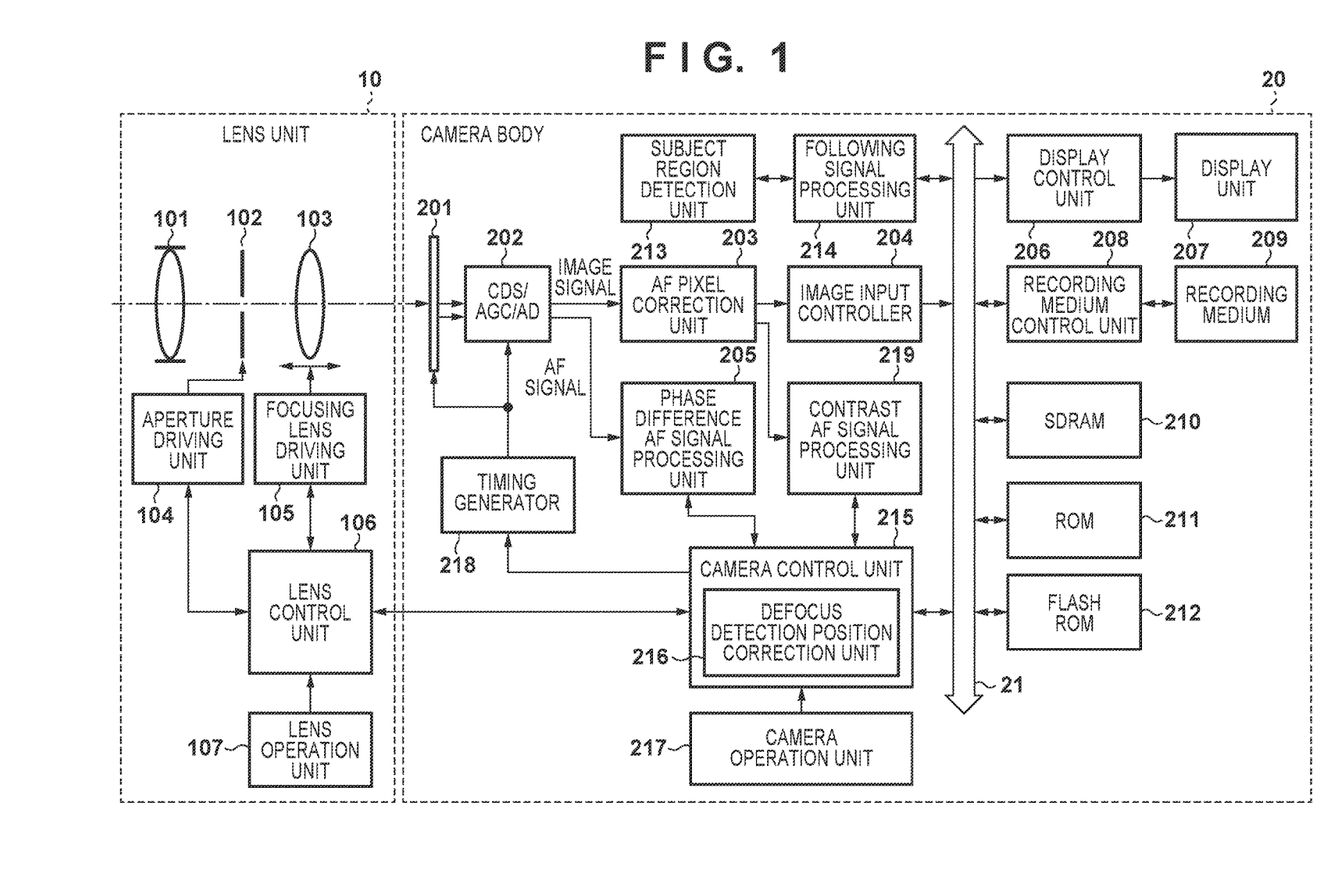
FIG. 1 is a block diagram that shows the configuration of an interchangeable lens camera that is one embodiment of an image capturing apparatus of the present invention.

FIG. 1 is a block diagram that shows the configuration of an interchangeable lens camera that is one embodiment of an image capturing apparatus of the present invention. The image capturing apparatus of the present embodiment is configured with an interchangeable lens unit 10 and a camera body 20. A lens control unit 106 that administers and controls overall operation of the lens, and a camera control unit 215 that administers overall operation of a camera system including the lens unit 10, are capable of communicating with each other via a terminal provided in a lens mount.

First, the configuration of the lens unit 10, which forms a subject image, will be described. An imaging optical system is configured from a fixed lens 101, an aperture 102, and a focusing lens 103. The aperture 102 is driven by an aperture driving unit 104, and controls an incident light amount on an image sensor 201 described later. The focusing lens 103 is driven by a focusing lens driving unit 105, and focus distance of an imaging optical system changes according to the position of the focusing lens 103. The aperture driving unit 104 and the focusing lens driving unit 105 are controlled by the lens control unit 106, and determine an opening amount of the aperture 102 and the position of the focusing lens 103.

A lens operation unit 107 is an input device group for a user to perform settings related to operation of the lens unit 10, such as AF/MF mode switching, shooting distance range setting, camera shake correction mode setting, and the like. When the lens operation unit 107 has been operated, the lens control unit 106 performs control according to the operation. The lens control unit 106 controls the aperture driving unit 104 and the focusing lens driving unit 105 according to control commands or control information received from a camera control unit 215 described later, and transmits lens control information to the camera control unit 215.

Next, the configuration of the camera body 20 will be described. The camera body 20 is configured to acquire an image signal from a light beam that passed through the imaging optical system of the lens unit 10. The image sensor 201 is configured with a CCD or CMOS sensor. A light beam incident from the imaging optical system of the lens unit 10 forms an image on a light-receiving plane of the image sensor 201, and is converted to a signal charge according to an incident light amount by photodiodes provided in pixels arrayed in the image sensor 201. The signal charges that have accumulated in the photodiodes, by a driving pulse that is output by a timing generator 218 according to an instruction of the camera control unit 215, are successively read out from the image sensor 201 as voltage signals corresponding to the signal charges.

The image sensor 201 of the present embodiment is configured with two types of pixels: image forming pixels that perform image capturing, and focus detection pixels that generate an image signal for performing autofocus (AF) by a phase difference detection method. This image sensor 201 can generate an image from the image forming pixels, and also can perform on-imaging plane phase difference AF from image signals generated from the focus detection pixels.

Figure 2A:
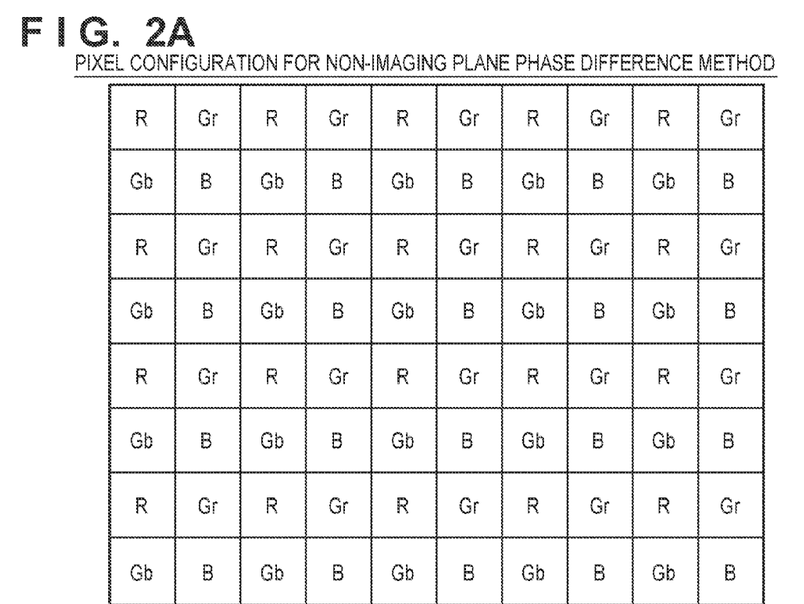
FIGS. 2A and 2B show pixel configurations of a non-imaging plane phase difference detection method and an on-imaging plane phase difference detection method.
Figure 2B:
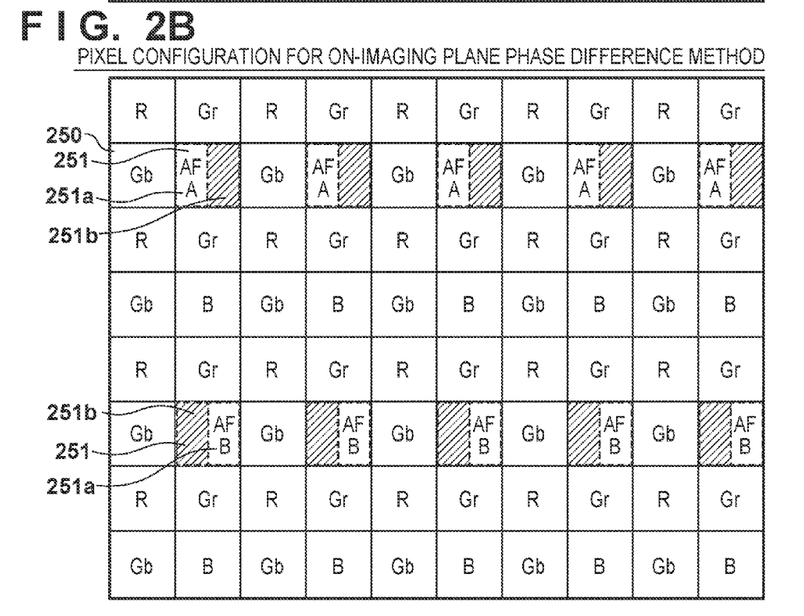

FIG. 2A shows a configuration of pixels in an ordinary image sensor that is not compatible with on-imaging plane phase difference AF, and FIG. 2B shows a configuration of pixels in an image sensor that is compatible with on-imaging plane phase difference AF. Note that here, in both cases it is assumed that primary color filters of a Bayer array are provided. In the pixel configuration of FIG. 2B corresponding to on-imaging plane phase difference AF, similar pixels as in FIG. 2A are arranged, and between those image forming pixels 250, focus detection pixels 251 are partially arranged. Each focus detection pixel 251 is divided in two in the horizontal direction of the paper face, and is divided into a light-receiving region (photodiode) 251a and a light-blocking portion 251b. Among the focus detection pixels 251 in FIG. 2B, there are pixels in which the light-blocking portions 251b are on the right side in the horizontal direction and pixels in which the light-blocking portions 251b are on the left side, and photodiodes A and B are respectively provided in these pixels. Note that the division method shown in FIG. 2B is only an example, and another method may be used, or a different division method may be applied in different pixels.

By masking a light beam incident on the focus detection pixel 251 with the light-blocking portion 251b, and receiving the light beam with the photodiode provided in the light-receiving region 251a, a phase difference AF method image signal can be acquired. The signals (A, B) obtained with the photodiodes A and B respectively are two AF image signals. Based on the two AF image signals, correlation computation is performed with a phase difference AF signal processing unit 205 described later, to calculate an image shift amount and various reliability information.

Returning to the description of FIG. 1, a CDS/AGC/AD converter 202 performs correlated double sampling for reset noise removal, gain adjustment, and signal digitization on the image signal and AF signals that were read out from the image sensor 201. The CDS/AGC/AD converter 202 outputs the image signal to an AF pixel correction unit 203, and outputs on-imaging plane phase difference AF signals to the phase difference AF signal processing unit 205.

The AF pixel correction unit 203, for an image signal that was output from the CDS/AGC/AD converter 202, corrects signals of focus detection pixels in FIG. 2B to an image forming signal using image forming pixels in the vicinity of the focus detection pixels. Then, the AF pixel correction unit 203 outputs the signal to an image input controller 204 and a contrast AF signal processing unit 219. The focus detection pixel output signals can only be used for phase difference detection method AF, and from the viewpoint of the image signal a focus detection pixel is the same as a scratched pixel. In a case where the focus detection pixels shown in FIG. 2B are arranged, it is necessary to supplement the image signal at the position of the focus detection pixels using signals of surrounding image forming pixels. The method of AF pixel correction is not a characterizing portion of the present invention, so a description thereof is not given here.

The image input controller 204 stores an image signal that was output from the AF pixel correction unit 203 in a SDRAM 210 via a bus 21. The image signal that was stored in the SDRAM 210 is read out via the bus 21 by a display control unit 206, and displayed in a display unit 207. Also, in an operation mode in which an image signal is recorded, the image signal that was stored in the SDRAM 210 is recorded to a recording medium 209 by a recording medium control unit 208.

A control program executed by the camera control unit 215 and various data necessary for control and the like are stored in a ROM 211, and various settings information and the like related to operation of the camera body 20, such as user settings information, is stored in a flash ROM 212.

The phase difference AF signal processing unit 205 performs correlation computation on the two AF image signals that were output from the CDS/AGC/AD converter 202, to calculate an image shift amount and reliability information (such as degree of matching of two images, degree of steepness of two images, contrast information, saturation information, and scratch information). The phase difference AF signal processing unit 205 outputs information such as the calculated image shift amount and reliability information to the camera control unit 215.

A contrast AF signal processing unit 219, for example, applies a contrast AF evaluation bandpass filter on the image information that was output from the AF pixel correction unit 203, and calculates a contrast evaluation value. The contrast AF signal processing unit 219 outputs the contrast evaluation value to the camera control unit 215. The contrast evaluation value has only slight relation to the present invention, so a detailed description thereof is omitted here.

The camera control unit 215 changes settings of the phase difference AF signal processing unit 205 as necessary, based on the image shift amount and reliability information that was obtained by the phase difference AF signal processing unit 205. For example, a large region is set for performing correlation computation when the image shift amount is at least a predetermined amount, and the type of bandpass filter applied to the image signal is changed according to the contrast information. The details of the correlation computation will be stated later with reference to FIGS. 7 and 8. Also, settings of the contrast AF signal processing unit 219 are also changed based on the contrast evaluation value obtained by the contrast AF signal processing unit 219. For example, when determined that the subject has low contrast, the subject is determined to be blurred, so the spectrum of the bandpass filter is changed to a spectrum allowing further reduction of a high band, for example.

The camera control unit 215 further performs control to exchange information between various function blocks within the camera body 20. The camera control unit 215 not only performs processing within the camera body 20, but also executes various camera functions operated by a user according to input from a camera operation unit 217, such as switching power on/off, changing settings, starting recording, starting AF control, confirming recorded images, or the like. Also, the camera control unit 215 transmits control commands or control information of the lens unit 10 to the lens control unit 106, and acquires information of the lens unit 10 from the lens control unit 106. Also, the camera control unit 215, with a defocus detection position correction unit 216 described later, performs correction of focus detection pixel position in an image capturing screen for performing correlation computation with the phase difference AF signal processing unit 205. The camera control unit 215, for example, is one or more programmable processors, and realizes operation of the overall camera system including the lens unit 10 by executing a control program that has been stored in the ROM 211, for example.

A following signal processing unit 214 imports a tracking image signal from the SDRAM 210 according to an instruction from the camera control unit 215, and from this tracking image signal generates a characteristic amount including a histogram of color information and a histogram of luminance information. A subject region detection unit 213 performs processing on the image signal presently being captured to search for a followed subject based on the generated characteristic amount, and determines whether or not a subject exists that corresponds to a followed subject from a predetermined region in a shooting screen. When a followed subject exists, a following region is determined based on the position coordinates where the subject exists, that result is transmitted to the camera control unit 215, and the camera control unit 215 sets that region as an AF frame position where AF is performed, and sets that region as a position where automatic exposure control (AE) is performed. Also, the position coordinates where the subject exists are held in the SDRAM 210, and by using this information when performing the next and subsequent detection of a followed subject region, it is possible to limit the area on which processing to search for a followed subject is performed. When specifying the followed subject region, each time the position coordinates where the subject exists are updated, the position coordinates held in the SDRAM 210 are also updated. The subject region detection unit 213 mainly detects faces.

The defocus detection position correction unit 216 is configured as one function of the camera control unit 215. As shown in FIG. 2B, the focus detection pixels are discretely arranged in the imaging plane. Therefore, focus detection pixels do not necessarily have to exist in the center of an AF frame arranged at a position specified by a user with the camera operation unit 217 or at a subject position detected based on the subject detection unit 213 and the following signal processing unit 214.

Figure 3:
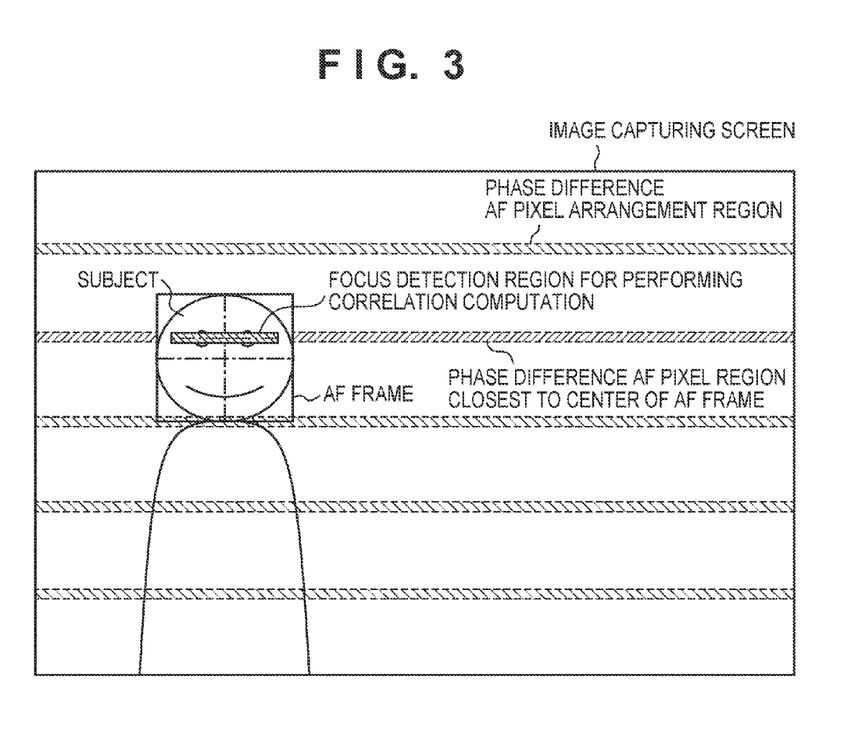
FIG. 3 illustrates setting of an AF frame.

Here, FIG. 3 shows the positional relationship on the imaging plane of a subject, an AF frame, a phase difference AF pixel arrangement region, a phase difference AF pixel region closest to the center of the AF frame, and a focus detection region for which correlation computation is performed. As shown in FIG. 3, in a case where there is a focus detection pixel in the entire imaging plane, the defocus detection position correction unit 216 sets a focus detection pixel region closest to the center of the AF frame as the position of the AF pixel region for which correlation computation will be performed. Also, in a case where there is not a focus detection pixel in the entire imaging plane, the defocus detection position correction unit 216 determines how to correct offset between the position of the AF frame and the position of a focus detection pixel according to shooting circumstances, and determines a final focus detection pixel position for which to perform correlation computation. Ordinarily the focus detection pixel region closest to the center of the AF frame is set as the position of the AF pixel region for which correlation computation will be performed. Then, the focus detection region for which correlation computation will actually be performed is set to a position corresponding to the X coordinate position of the AF frame within the AF pixel region. Thus, by using the results of correlation computation of the AF pixel region for a subject captured with the AF frame, it is possible to focus on the subject.

Next, the camera control unit 215, using a focus detection pixel that was determined by the defocus detection position correction unit 216, calculates a defocus amount based on the results of correlation computation from processing performed by the phase difference AF signal processing unit 205. The camera control unit 215 performs control to drive the focusing lens 103 via the lens control unit 106 based on the calculated defocus amount or the contrast information that was calculated by the contrast AF signal processing unit 219.

Figure 4:
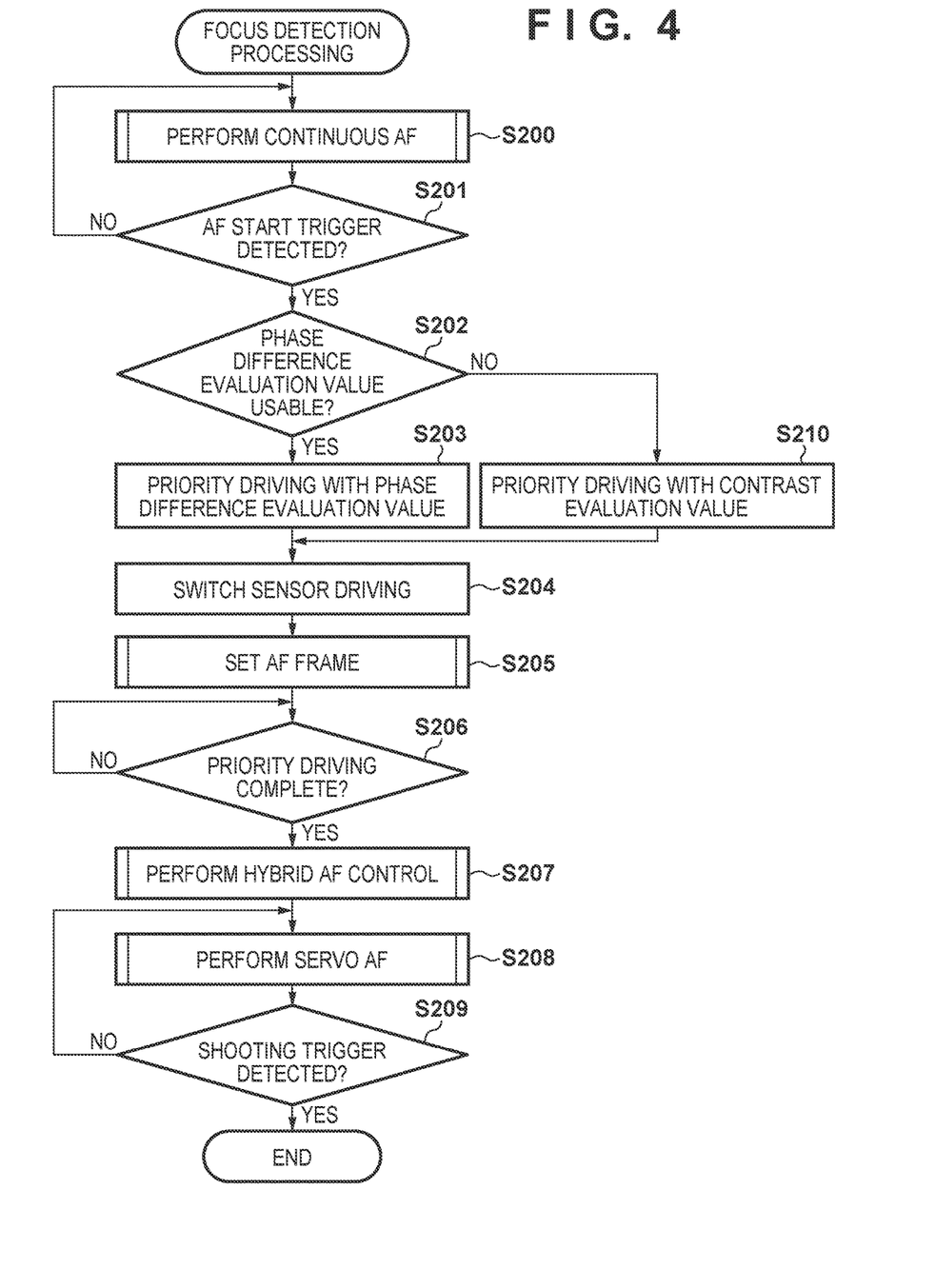
FIG. 4 is a flowchart for illustrating focus detection processing.

FIG. 4 is a flowchart for illustrating focus detection processing executed by the camera control unit 215. In step S200, the camera control unit 215 executes continuous AF that continually focuses on the subject after starting the camera. The details of continuous AF will be described later with reference to FIG. 5. In step S201, when operation of a release switch in the camera operation unit 217 was detected (AF start trigger), processing proceeds to step S202. In step S202, it is determined whether or not an evaluation value for phase difference AF focus adjustment (below, a 'phase difference evaluation value') can be used. As the method for determining whether or not a phase difference evaluation value can be used, a configuration is conceivable in which reliability is obtained according to image height or F-stop value to perform the determination, for example, but the method used has no direct connection to the present embodiment, so a detailed description thereof is omitted here.

When determined in step S202 that the phase difference evaluation value can be used, processing proceeds to step S203, where the focusing lens 103 is moved by an obtained focus driving amount. When determined in step S202 that the phase difference evaluation value cannot be used, processing proceeds to step S210, where the focusing lens 103 is moved to a contrast AF scan start position based on an evaluation value for contrast AF focus adjustment (below, a 'contrast evaluation value'). In this case, the greater the in-focus degree of the contrast evaluation value, the closer the current focus position is to the in-focus position, so the driving amount of the focus lens 103 will be correspondingly reduced.

In step S204, driving of the image sensor 201 is switched for performing autofocus. For example, if it is desired to shorten the AF time, the number of pixels may be reduced and high speed image read-out performed, or in a dimly-lit scene or the like the number of pixels may be increased in order to obtain a better signal-to-noise ratio, for example. In step S205, AF frame settings are performed. If a subject has been detected as shown in FIG. 3, the AF frame is set to the specified region of the subject, and a contrast evaluation value is obtained from image data within the region. The focus detection pixel region closest to the center of the AF frame that was set is set for the phase difference evaluation value.

In step S206, processing waits for completion of the focus driving executed in steps S203 or S210. In step S207, hybrid AF control described later is performed, and then processing proceeds to step S208. In steps S208 and S209, servo AF is executed that continuously focuses until there is a shooting instruction, and then processing is finished. The servo AF control flow itself is the same as continuous AF so a detailed description will be given with reference to FIG. 5. Also, the focus adjustment control of steps S202 to S207 is also applicable to AF for continuous shooting, or the like.

Figure 5:
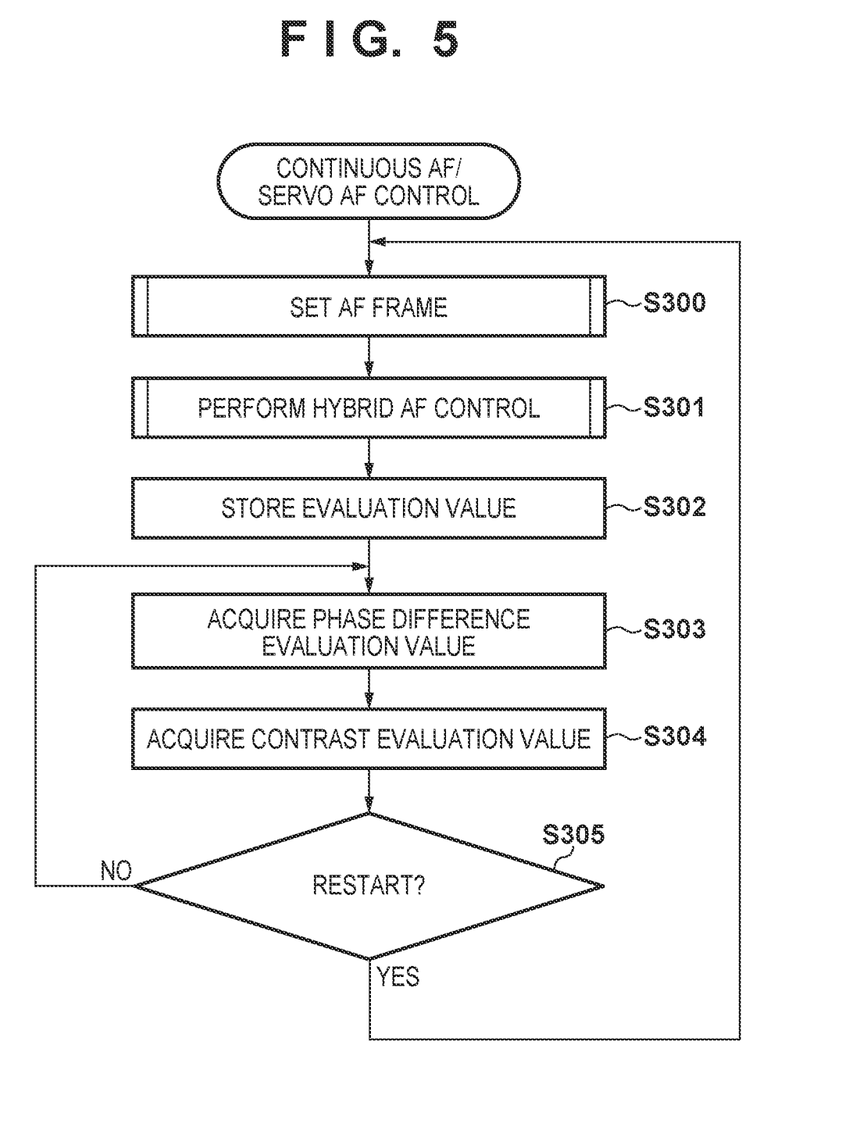
FIG. 5 is a flowchart for illustrating a continuous AF operation.
Figure 6:
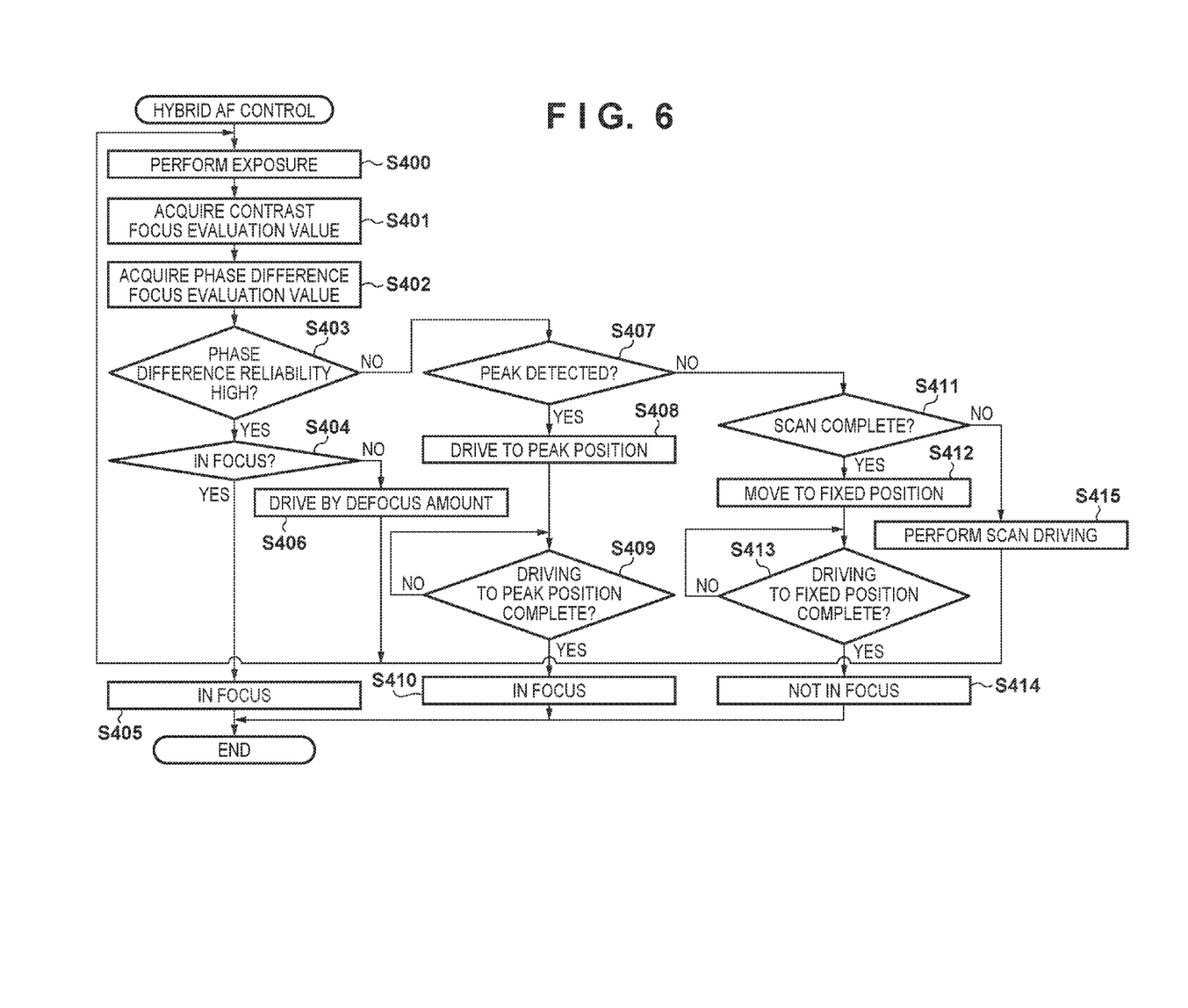
FIG. 6 is a flowchart for illustrating a hybrid AF operation.
Figure 8:
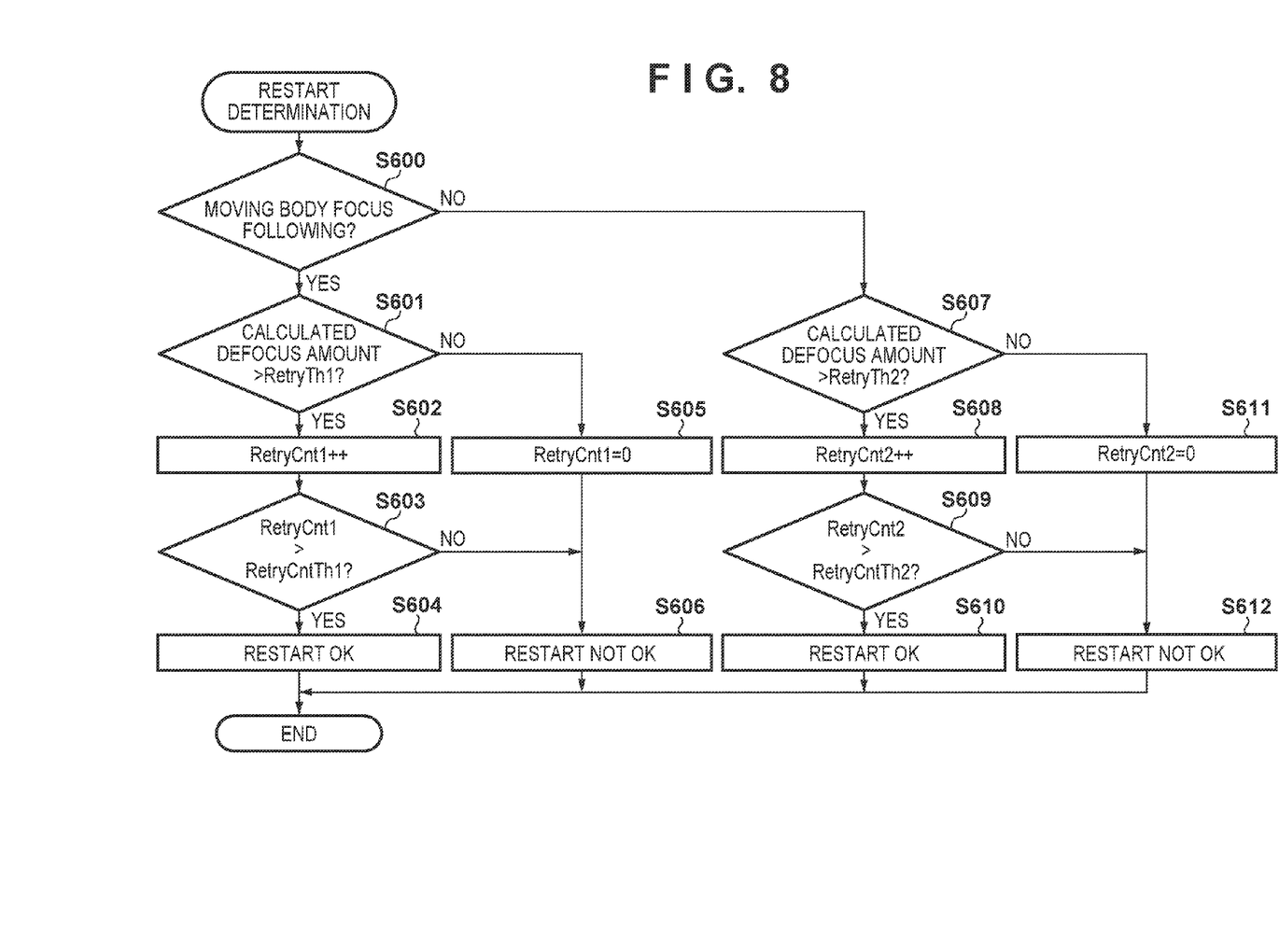
FIG. 8 is a flowchart for illustrating a restart determination in FIG. 5.

FIG. 5 is a flowchart for illustrating the continuous AF in step S200 in FIG. 4 and the servo AF in step S208 in FIG. 4. First, in step S300, the AF frame setting described in step S205 in FIG. 4 is performed. In step S301, hybrid AF control described later with reference to FIG. 6 is performed. In step S302, a phase difference evaluation value and a contrast evaluation value are each stored in the SDRAM 210. In step S303, a latest phase difference evaluation value is acquired and stored in the SDRAM 210. In step S304, a latest contrast evaluation value is acquired and stored in the SDRAM 210. In step S305, the evaluation value stored in the SDRAM 210 in step S301 is compared to the latest evaluation value acquired from step S303 onward to determine whether the evaluation value has changed by at least a predetermined amount. Afterward, in step S305 a restart determination described later with reference to FIG. 8 is performed. The restart determination is an operation that determines whether or not to perform hybrid AF again. When it was determined to perform a restart, processing returns to step S300, where the hybrid AF operation is performed again. When it was determined in step S305 that there has been no change for at least a predetermined number of times, processing returns to step S303, and the evaluation values are again observed.

Here, in the present embodiment, when in an in-focus state with the phase difference evaluation value in step S302, only phase difference evaluation values are compared in step S305. By doing so, when in an in-focus state with the phase difference evaluation value, it is possible to avoid a hunting operation that performs AF again due to fluctuation of the contrast evaluation value. However, for example in a case of following focus of a moving body or the like, if it is desired to perform AF as quickly as possible, changes in the phase difference and contrast evaluation values may be determined by a logical disjunction. Thus the basic control flow is the same for continuous AF or servo AF. However, in the present embodiment a method is adopted in which power consumption prior to the AF start trigger is suppressed by setting a quicker control period for servo AF than for continuous AF, and quickly following focus after an AF instruction. Also, a configuration may be adopted in which continuous AF and servo AF can each be selected for execution or non-execution by the user from the camera operation unit 217 or the like.

Figure 7:
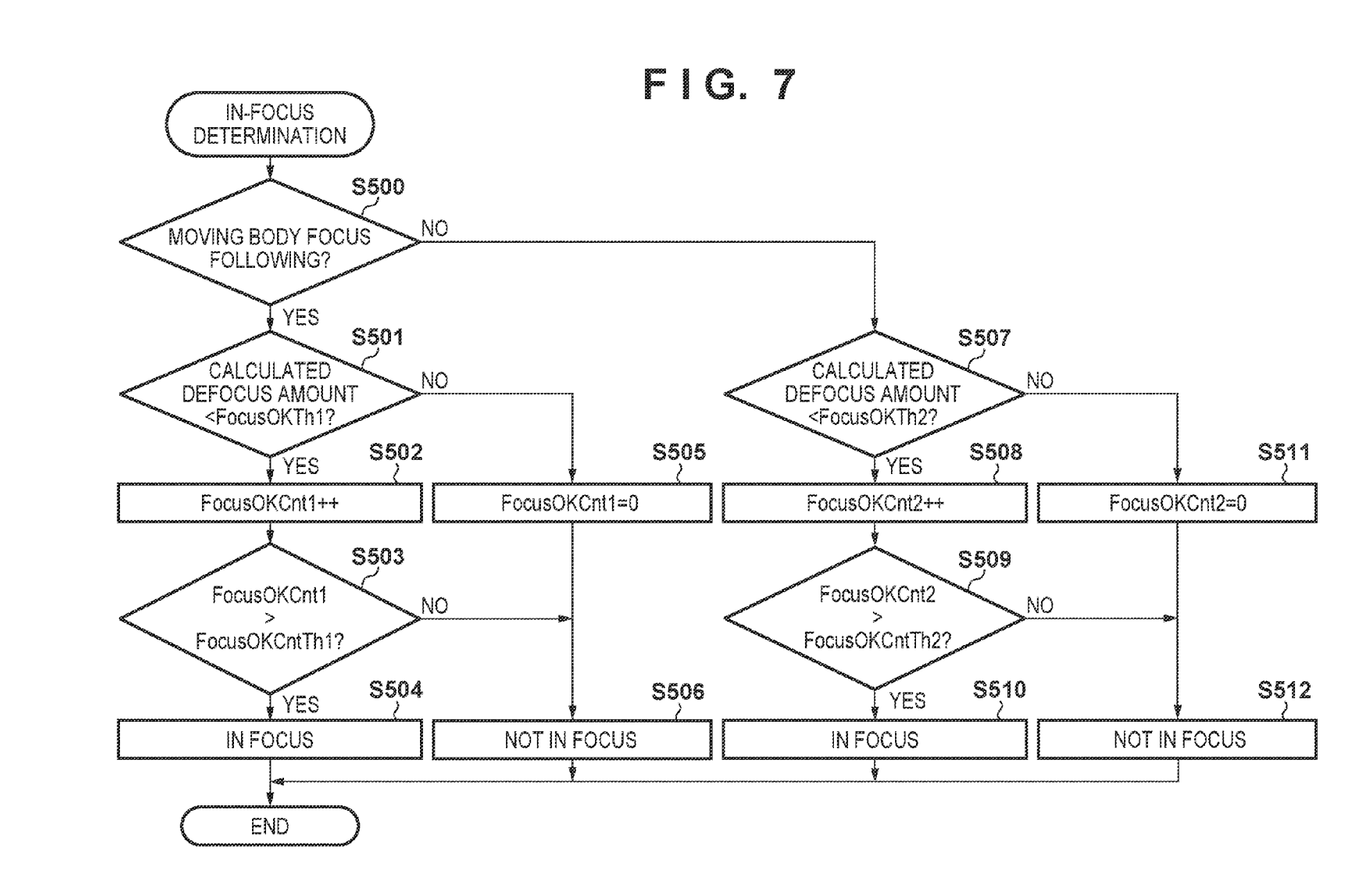
FIG. 7 is a flowchart for illustrating an in-focus determination in FIG. 6.

FIG. 6 is a flowchart for illustrating the hybrid AF control in step S207 in FIG. 4 and step S301 in FIG. 5. In step S400, image data for calculating an evaluation value is exposed. In step S401, a contrast evaluation value is acquired. In step S402, a phase difference evaluation value is acquired. In step S403, it is determined whether or not the phase difference evaluation value can be used. In step S404, an in-focus determination described later with reference to FIG. 7 is executed, and if in focus, processing moves to the in-focus state of step S405 and then ends. When the user operated the camera operation unit 217 or the like to move to the in-focus state, display is output to the display unit 207 or the like such that being in the in-focus state is understood.

When it was determined in step S404 that the defocus amount is outside of a predetermined depth, in step S406, the focusing lens 103 is moved by an obtained defocus driving amount and then processing returns to step S400. If it was not determined in step S403 that the phase difference evaluation value can be used, processing proceeds to step S407, where it is determined whether or not a peak has been detected for the contrast evaluation value. This peak is determined by whether or not a maximum value of at least a predetermined value has been detected among the contrast evaluation values acquired at each lens position. In step S408 the focusing lens is moved to the peak position that was detected in step S407. In step S409, processing waits for the focusing lens 103 to be moved to the peak position, and afterward processing proceeds to step S410 to move to the in-focus state, and then processing is ended.

In step S411, it is determined whether or not the focusing lens 103 was scanned through all regions from a far end to a near end. If the focusing lens 103 was scanned through all regions, processing proceeds to step S412, and if the focusing lens 103 was not scanned through all regions, processing proceeds to step S415. In step S415, the focusing lens 103 is moved by a predetermined amount, processing returns to step S400, and scanning is continued. Because a peak could not be detected in step S412, the focusing lens 103 is moved to an appropriate fixed position. A scan start position or a position beyond focus may be adopted for this fixed position. Afterward, in step S414 a change is made to a non-focused state and then processing is ended. When the user operated the camera operation unit 217 or the like to move to the in-focus state, display is output to the display unit 207 or the like such that being in the in-focus state is understood.

FIG. 7 is a flowchart for illustrating the in-focus determination in step S404 in FIG. 6. First, in step S500 it is determined whether or not to follow focus on a moving body. As the conditions for following focus on a moving body, a determination may be made by discriminating the movement state of the subject that was detected, or a configuration may be adopted in which a moving body focus following mode is selected using the camera operation unit 217 or the like. In step S501, it is determined whether or not the calculated defocus amount in the phase difference focus evaluation value acquired in step S402 is less than a predetermined depth threshold value FocusOKTh1. If the calculated defocus amount is less than the predetermined depth threshold value, processing proceeds to step S502, where a counter FocusOKCnt1 for discriminating whether or not the calculated defocus amount is within the predetermined depth threshold value by a predetermined number of times is incremented. If the calculated defocus amount is at least the predetermined depth threshold value, processing proceeds to step S505, where the FocusOKCnt1 is cleared to 0. Also, although not shown in the drawings, the FocusOKCnt1 has been cleared to 0 when starting AF.

In step S503, the FocusOKCnt1 is compared to a predetermined number of times threshold value FocusOKCntTh1, and if the FocusOKCnt1 has exceeded the threshold value, it is determined that the calculated defocus amount is within the predetermined depth by at least the predetermined number of times, and processing proceeds to step S504 and sets the in-focus state. If the FocusOKCnt1 is no more than the threshold value, processing proceeds to step S506, the in-focus state is considered not yet attained, and processing is ended.

In step S507, it is determined whether or not the calculated defocus amount in the phase difference focus evaluation value acquired in step S402 is less than a predetermined depth threshold value FocusOKTh2. If the calculated defocus amount is less than the predetermined depth threshold value, processing proceeds to step S508, where the counter FocusOKCnt2 for discriminating whether or not the calculated defocus amount is within the predetermined depth threshold value by at least a predetermined number of times is incremented. If the calculated defocus amount is at least the predetermined depth threshold value, processing proceeds to step S511, where the FocusOKCnt2 is cleared to 0. Also, as in the case of the FocusOKCnt1, the FocusOKCnt2 has been cleared to 0 when starting AF.

In step S509, the FocusOKCnt2 is compared to a predetermined number of times threshold value FocusOKCntTh2, and if the FocusOKCnt2 has exceeded the threshold value, it is determined that the calculated defocus amount is within the predetermined depth by at least the predetermined number of times, and processing proceeds to step S510 and sets the in-focus state. If the FocusOKCnt2 has not exceeded the threshold value, processing proceeds to step S512, the in-focus state is considered not yet attained, and processing is ended.

Note that in the present embodiment, the relationship between the FocusOKTh and the FocusOKCntTh is set as follows.

FocusOKTh1>FocusOKTh2

FocusOKCntTh1<FocusOKCntTh2

That is, when focus follows movement of a moving body, in order to increase frame rate, and in order to not require as much focus accuracy as with a still image because the subject is a moving body, the in-focus determination is made less strict than in a case of not performing focus following.

Note that the above parameters may be made to differ between the hybrid AF control in step S207 in FIG. 4, the hybrid AF control in step S301 in FIG. 5, and the hybrid AF control in continuous AF and servo AF. Also, these parameters can be changed according to subject movement or aperture value, subject distance or subject movement direction, or the like. Further, although not shown in the drawings, the FocusOKCntTh may be changed according to the calculated defocus amount obtained initially. For example, a configuration or the like is conceivable in which, if a defocus amount sufficiently within the threshold value was obtained at the initial in-focus determination, the FocusOKCntTh is not increased, thereby shortening the time until the in-focus determination. In the present embodiment, when servo AF was executed, the FocusOKTh1 and the FocusOKCntTh1 are set larger than in the case of performing one-shot AF, within a range that satisfies the above inequality expression. With this configuration, when performing focus following of a moving body the in-focus determination can be performed quickly, so it is possible to shorten the time until AF completion.

FIG. 8 is a flowchart for illustrating the restart determination in step S305 in FIG. 5. First, in step S600 it is determined whether or not to follow focus on a moving body. The conditions for following focus on a moving body, as with the in-focus determination in FIG. 7, may be determined by discriminating the movement state of the subject that was detected, or a configuration may be adopted in which a moving body focus following mode is selected using the camera operation unit 217 or the like.

In step S601, it is determined whether or not the calculated defocus amount in the phase difference focus evaluation value acquired in step S402 in FIG. 6 is greater than a predetermined depth threshold value RetryTh1. If the calculated defocus amount is greater than the predetermined depth threshold value, processing proceeds to step S602, where a counter RetryCnt1 for discriminating whether or not the calculated defocus amount has exceeded the predetermined depth threshold value by a predetermined number of times is incremented. If the calculated defocus amount is within the predetermined depth threshold value, processing proceeds to step S605, where the RetryCnt1 is cleared to 0. Also, although not shown in the drawings, the RetryCnt1 has been cleared to 0 when starting AF.

In step S603, the RetryCnt1 is compared to a predetermined number of times threshold value RetryCntTh1, and if the RetryCnt1 has exceeded the threshold value, it is determined that the calculated defocus amount has exceeded the predetermined depth threshold value by the predetermined number of times, i.e. the subject is out of focus, and processing proceeds to step S604 and a restart is performed. If the RetryCnt1 has not exceeded the threshold value, processing proceeds to step S606, it is determined that a restart should not yet be performed, and processing is ended.

In step S607, it is determined whether or not the calculated defocus amount in the phase difference focus evaluation value acquired in step S402 in FIG. 6 is greater than a predetermined depth threshold value RetryTh2. If the calculated defocus amount is greater than the predetermined depth threshold value, processing proceeds to step S608, where a counter RetryCnt2 for discriminating whether or not the calculated defocus amount has exceeded the predetermined depth threshold value by a predetermined number of times is incremented. If the calculated defocus amount is within the predetermined depth threshold value, processing proceeds to step S611, where the RetryCnt2 is cleared to 0. Also, as in the case of the RetryCnt1, the RetryCnt2 has been cleared to 0 when starting AF.

In step S609, the RetryCnt2 is compared to a predetermined number of times threshold value RetryCntTh2, and if the RetryCnt2 has exceeded the threshold value, it is determined that the calculated defocus amount has exceeded the predetermined depth threshold value by the predetermined number of times, i.e. the subject is out of focus, and processing proceeds to step S610 and a restart is performed. If the RetryCnt2 has not exceeded the threshold value, processing proceeds to step S612, it is determined that a restart should not yet be performed, and processing is ended.

Note that in the present embodiment, the relationship between the RetryTh and the RetryCntTh is set as follows.

RetryTh1>RetryTh2

RetryCntTh1>RetryCntTh2

That is, when focus follows movement of a moving body, the frame rate drops if scanning of the focusing lens 103 is performed frequently, so in order to reduce the frequency of scanning when focused once, threshold values are set such that a restart is comparatively unlikely to occur.

Note that the above parameters may be made to differ between the restart determinations in continuous AF and servo AF. Also, these parameters can be changed according to subject movement or aperture value, subject distance or subject movement direction, or the like. Further, although not shown in the drawings, the parameters may be changed according to a panning operation by the user. For example, a configuration or the like is conceivable in which a restart is made less likely by increasing the RetryCntTh during panning, thereby preventing a mistaken focus adjustment operation.

Note that with this configuration, when performing focus following of a moving body, the RetryCntTh1, which is the threshold value during servo AF, is increased. With this configuration, when performing focus following of a moving body, by making a restart unlikely to occur, the focus adjustment time can be shortened, and so AF can be completed quickly.

As described above, the image capturing apparatus of the present embodiment can quickly perform shooting processing with priority given to AF speed both in a case where a subject is moving and in a case where the subject is still. Also, in a case where the subject is still, by giving priority to AF accuracy, it is possible to realize focusing suitable for the detected subject.

Note that the present invention is not limited to the exemplary embodiment described above. A configuration may also be adopted in which the lens unit in FIG. 1 has a zoom lens and a zoom driving unit, or a configuration may be adopted in which the lens unit has an image shake correction lens. A configuration may also be adopted in which the image capturing apparatus is not an interchangeable lens camera but is a fixed lens camera. The arranged position or density of the focus detection pixels for on-imaging plane phase difference detection in FIG. 2B may be changed, or focus detection pixels may be arranged that are capable of detecting a phase difference in the vertical direction rather than a phase difference in the horizontal direction.

Above, the present invention was described in detail with reference to exemplary embodiments, but the present invention is not limited to these specific embodiments, and can be variously modified or altered within the scope of the invention disclosed in the claims.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-018798, filed Feb. 2, 2015, which is hereby incorporated by reference herein in its entirety.

What is claimed is:

1. An image capturing apparatus, comprising:
an image sensor having focus detection pixels configured to detect a phase difference of a subject image; and
at least one processor or circuit configured to perform the operations of the following units:
an acquisition unit configured to acquire a defocus amount of the subject image based on signals of the focus detection pixels;
a focus control unit configured to adjust focus of an imaging optical system based on the defocus amount that was acquired; and
a determination unit configured to perform determination whether or not the imaging optical system is in an in-focus state by comparing the defocus amount to a predetermined threshold value, wherein the determination unit performs the determination by comparing the defocus amount of the imaging optical system, which exists at the time of performing the comparison, to the predetermined threshold value,
wherein the determination unit determines that the imaging optical system is in the in-focus state when a state where the defocus amount is within the predetermined threshold value has continued for more than a predetermined number of times, and
wherein the determination unit sets a larger value for the predetermined threshold value in a case where the imaging optical system focuses on a moving subject than in a case where the imaging optical system focuses on a still subject.

2. The image capturing apparatus according to claim 1, wherein the at least one processor or circuit is further configured to perform the operations of:
a switching unit configured to switch between causing the focus control unit to execute operation to focus on a moving subject and causing the focus control unit to execute operation to focus on a still subject.

3. The image capturing apparatus according to claim 2, wherein the switching unit is configured to detect movement of a subject, and based on the detected movement, switches between causing the focus control unit to execute operation to focus on a moving subject and causing the focus control unit to execute operation to focus on a still subject.

4. The image capturing apparatus according to claim 2, wherein the switching unit is an operation unit allowing a user to switch between causing the focus control unit to execute operation to focus on a moving subject and causing the focus control unit to execute operation to focus on a still subject.

5. The image capturing apparatus according to claim 1, wherein the determination unit is configured to change the predetermined threshold value and the predetermined number of times based on a condition of the subject whether the subject is the moving subject or not, or the state of the image capturing apparatus.

6. The image capturing apparatus according to claim 5, wherein the condition of the subject or the state of the image capturing apparatus is at least any of movement of the subject, movement direction of the subject, subject distance, or aperture value.

7. The image capturing apparatus according to claim 1, wherein the determination unit is configured to change the predetermined number of times based on the defocus amount.

8. The image capturing apparatus according to claim 1, wherein the focus control unit does not adjust focus of the imaging optical system based on the defocus amount when the defocus amount is determined to be smaller than the predetermined threshold value by the determination unit.

9. An image capturing apparatus, comprising:
an image sensor having focus detection pixels configured to detect a phase difference of a subject image; and
at least one processor or circuit configured to perform the operations of the following units:
   an acquisition unit configured to acquire a defocus amount of the subject image based on signals of the focus detection pixels;
   a focus control unit configured to adjust focus of an imaging optical system based on the defocus amount that was acquired;
   a first determination unit configured to perform a first determination whether or not the defocus amount is smaller than a first threshold value; and
   a second determination unit configured to, after the defocus amount is determined to be smaller than the first threshold value, perform a second determination whether or not to cause the focus control unit to operate again by comparing the defocus amount to a second threshold value,
wherein the first determination unit determines that the imaging optical system is in the in-focus state when a state where the defocus amount is within the first threshold value has continued for more than a predetermined number of times, and the second determination unit performs the second determination after the imaging optical system is determined to be in the in-focus state by the first determination unit,
wherein the second determination unit determines whether to cause the focus control unit to operate again or not by comparing the defocus amount of the imaging optical system, which exists at the time of performing the second comparison, to the second threshold value, and
wherein the second determination unit sets a larger value for the second threshold value in a case where the imaging optical system focuses on a moving subject than in a case where the imaging optical system focuses on a still subject.

10. The image capturing apparatus according to claim 9, wherein the second determination unit determines to cause the focus control unit to operate again when a state where the defocus amount exceeds the second threshold value has continued for more than a predetermined number of times.

11. The image capturing apparatus according to claim 10, wherein the second determination unit is configured to change the second threshold value and the predetermined number of times based on the state of the image capturing apparatus.

12. The image capturing apparatus according to claim 11, wherein the state of the image capturing apparatus is a state where the image capturing apparatus is moved in a panning manner.

13. The image capturing apparatus according to claim 9, wherein the second determination unit determines whether the subject to be focused on by the imaging optical system is moving or not between the first determination by the first determination unit and the second determination by the second determination unit.

14. A method of controlling an image capturing apparatus comprising an image sensor having focus detection pixels configured to detect a phase difference of a subject image, the method comprising:
   acquiring a defocus amount of the subject image based on signals of the focus detection pixels;
   adjusting focus of an imaging optical system based on the defocus amount that was acquired; and
   performing determination whether or not the imaging optical system is in an in-focus state by comparing the defocus amount to a predetermined threshold value, wherein in the performing, the determination is performed by comparing the defocus amount of the imaging optical system, which exists at the time of performing the comparison, to the predetermined threshold value,
   wherein in the performing, it is determined that the imaging optical system is in the in-focus state when a state where the defocus amount is within the predetermined threshold value has continued for more than a predetermined number of times, and
   wherein in the performing, a larger value is set for the predetermined threshold value in a case where the imaging optical system focuses on a moving subject than in a case where the imaging optical system focuses on a still subject.

15. A method of controlling an image capturing apparatus comprising an image sensor having focus detection pixels configured to detect a phase difference of a subject image, the method comprising:
   acquiring a defocus amount of the subject image based on signals of the focus detection pixels;
   adjusting focus of an imaging optical system based on the defocus amount that was acquired;
   performing a first determination to determine whether or not the defocus amount is smaller than a first threshold value; and
   performing a second determination to, after the defocus amount is determined to be smaller than the first threshold value, determine whether or not to cause the focus adjustment to operate again by comparing the defocus amount to a second threshold value,
   wherein in the first determination, it is determined that the imaging optical system is in the in-focus state when a state where the defocus amount is within the first threshold value has continued for more than a predetermined number of times, and the second determination is performed after the imaging optical system is determined to be in the in-focus state in the first determination,
   wherein in the second determination, whether to cause the focus adjustment to operate again or not is determined by comparing the defocus amount of the imaging optical system, which exists at the time of performing the comparison, to the second threshold value, and
   wherein in the second determination, a larger value is set for the second threshold value in a case where the imaging optical system focuses on a moving subject than in a case where the imaging optical system focuses on a still subject.

16. A non-transitory computer-readable storage medium storing a program for causing a computer to execute a method of controlling an image capturing apparatus comprising an image sensor having focus detection pixels configured to detect a phase difference of a subject image, the control method comprising:
 acquiring a defocus amount of the subject image based on signals of the focus detection pixels;
 adjusting focus of an imaging optical system based on the defocus amount that was acquired; and
 performing determination whether or not the imaging optical system is in an in-focus state by comparing the defocus amount to a predetermined threshold value, wherein in the performing, the determination is performed by comparing the defocus amount of the imaging optical system, which exists at the time of performing the comparison, to the predetermined threshold value,
 wherein in the performing, it is determined that the imaging optical system is in the in-focus state when a state where the defocus amount is within the predetermined threshold value has continued for more than a predetermined number of times, and
 wherein in the performing, a larger value is set for the predetermined threshold value in a case where the imaging optical system focuses on a moving subject than in a case where the imaging optical system focuses on a still subject.

17. A non-transitory computer-readable storage medium storing a program for causing a computer to execute a method of controlling an image capturing apparatus comprising an image sensor having focus detection pixels configured to detect a phase difference of a subject image, the control method comprising:
 acquiring a defocus amount of the subject image based on signals of the focus detection pixels;
 adjusting focus of an imaging optical system based on the defocus amount that was acquired;
 performing a first determination to determine whether or not the defocus amount is smaller than a first threshold value; and
 performing a second determination to, after the defocus amount is determined to be smaller than the first threshold value, determine whether or not to cause the focus adjustment to operate again by comparing the defocus amount to a second threshold value,
 wherein in the first determination, it is determined that the imaging optical system is in the in-focus state when a state where the defocus amount is within the first threshold value has continued for more than a predetermined number of times, and the second determination is performed after the imaging optical system is determined to be in the in-focus state in the first determination,
 wherein in the second determination, whether to cause the focus adjustment to operate again or not is determined by comparing the defocus amount of the imaging optical system, which exists at the time of performing the comparison, to the second threshold value, and
 wherein in the second determination, a larger value is set for the second threshold value in a case where the imaging optical system focuses on a moving subject than in a case where the imaging optical system focuses on a still subject.

\* \* \* \* \*